(12) United States Patent
Hille-Doering et al.

(10) Patent No.: US 9,152,388 B2
(45) Date of Patent: Oct. 6, 2015

(54) TAILORED LANGUAGE SETS FOR BUSINESS LEVEL SCRIPTING

(71) Applicants: Reiner Hille-Doering, Karlsruhe (DE); Stefan Jesse, Sinsheim (DE)

(72) Inventors: Reiner Hille-Doering, Karlsruhe (DE); Stefan Jesse, Sinsheim (DE)

(73) Assignee: SAP SE, Walldorf (DE)

( * ) Notice: Subject to any disclaimer, the term of this patent is extended or adjusted under 35 U.S.C. 154(b) by 156 days.

(21) Appl. No.: 13/835,390

(22) Filed: Mar. 15, 2013

(65) Prior Publication Data
US 2014/0282376 A1    Sep. 18, 2014

(51) Int. Cl.
G06F 9/44    (2006.01)
G06F 9/455   (2006.01)

(52) U.S. Cl.
CPC .............. *G06F 8/31* (2013.01); *G06F 9/45529* (2013.01)

(58) Field of Classification Search
CPC ................... G06F 8/30–8/31; G06F 9/45512; G06F 17/3089
USPC ........................................................ 717/115
See application file for complete search history.

(56) References Cited

U.S. PATENT DOCUMENTS

| | | | |
|---|---|---|---|
| 8,032,860 B2 * | 10/2011 | Piehler et al. ................. | 717/110 |
| 2008/0127128 A1 * | 5/2008 | Mateescu et al. ............. | 717/139 |
| 2010/0235830 A1 * | 9/2010 | Shukla et al. .................... | 718/1 |
| 2012/0143839 A1 * | 6/2012 | Zhou .............................. | 707/706 |
| 2013/0326491 A1 * | 12/2013 | Caira et al. .................... | 717/146 |
| 2014/0282367 A1 * | 9/2014 | Harrill et al. .................. | 717/105 |

OTHER PUBLICATIONS

Conzett et al., "The Front of IBM WebSphere," IBM Redbooks, Jan. 2000, 202pg.*
Hoehrmann, Scripting Media Types (RFC4329), IP.com No. IPCOM000135888D, 2006, 17pg.*

* cited by examiner

*Primary Examiner* — Ryan Coyer
(74) *Attorney, Agent, or Firm* — Mintz Levin Cohn Ferris Glovsky and Popeo, P.C.

(57) ABSTRACT

A subset of a standardized scripting language can be defined, and a tailored grammar for the subset of the standardized scripting language can be created to match the subset language features. The tailored grammar need not be a subset of a grammar of the standardized scripting language. A subset-specific type system can be provided for the subset of the standardized scripting language such that the subset-specific type system sits on top of a defined type system for the standardized scripting language. A user scripting input can be received via a script editor that employs the subset of the standardized scripting language, the tailored grammar, and the subset-specific type system. The user scripting input can include creating a user interface feature accessing data in one or more objects. Related systems, methods, and computer program products are also described.

16 Claims, 13 Drawing Sheets

TAILORED LANGUAGE SETS FOR BUSINESS LEVEL SCRIPTING

TECHNICAL FIELD

The subject matter described herein relates generally to the use of scripting languages, and in particular to a tailored language set for use in business-level scripting.

BACKGROUND

Scripting languages are programming languages that support the writing of scripts. Scripts generally refer to programs written for a software environment to automate the execution of tasks. Many business software applications, analytical software applications, etc. include features allowing business users to control the specific behavior of the application in certain situations using scripts composed in a scripting language. For example, software applications designed to enable application designers to create analysis applications and dashboards for Web browsers and mobile devices based on one or more underlying data sources can typically make use of scripting languages to enable a designer to link user interface features to data objects and other underlying data structures to provide dynamically updatable views on the data in these data objects and data structures. An important requirement for the scripting languages used in this manner is the ease of use for the target user group and their skills. In many cases, designers likely to use such an application may be business users who have a knowledge of an organization's business processes and a working but not an advanced knowledge of scripting or programming.

One option for the scripting language in such applications is the use of one or more standardized scripting languages, such as for example ECMAScript, Javascript (a dialect of ECMAScript), and the like. Standardized languages generally benefit from the "learning effect" of a large group of users and experts and the ready availability of classes, instructional materials, and the like. Additionally, as they are based on an official standard, the grammar, rules, etc. are generally universal such that scripts can be directly executed in a browser without additional processing and/or run on any server environment using one of many available runtime processors. Because preprocessing is not required, scripts prepared in a standardized scripting language such as ECMAScript can be easily debugged using the native debugger of the execution platform. Additionally, a user's investment in learning the language is generally not specific to a given application or suite of applications.

In other cases, the scripting language is proprietary (e.g. Visual Basic for Applications available from Microsoft Corp. of Redmond, Wash.), at least in part because proprietary languages can be specially designed for the requirements of the host application and can therefore be designed specifically to support editors and other functionality that are well adapted to the specific domain needs of an application or suite of applications. However, a proprietary language generally cannot be directly executed within a browser and therefore requires its own runtime or cross-compilation. Furthermore, the original script generally cannot be natively debugged on the execution platform. There is also no learning effect with a proprietary language that is comparable to that noted above for standardized languages.

SUMMARY

In one aspect, a method includes defining a subset of a standardized scripting language, creating a tailored grammar for the subset of the standardized scripting language to match the subset language features without being a subset of a grammar of the standardized scripting language, providing a subset-specific type system for the subset of the standardized scripting language such that the subset-specific type system sits on top of a defined type system for the standardized scripting language, and receiving at least one user scripting input comprising at least part of creating a user interface feature accessing data in one or more objects via a script editor that employs the subset of the standardized scripting language, the tailored grammar, and the subset-specific type system.

In some variations one or more of the following features can optionally be included in any feasible combination. The standardized scripting language can include ECMAScript, JavaScript, or the like. The subset-specific typing system can include type descriptions to provide type information for each component available via the script editor. The subset-specific typing system can include a second domain-specific language that handles typing for one or more components related to the one or more objects. The user interface feature can include one or more of a chart and a table. The tailored grammar can include requiring that a variable declaration link a declared variable to another object.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Despite the advantages noted above regarding the use of a standardized scripting language, such as for example ECMAScript, such languages do have several disadvantages that restrict their utility for scripting by a business user who may lack a technical programming or coding background. For example, ECMAScript and other standardized scripting languages are typically fairly complex, providing features and functionality such as closures, complex scope handling, and other aspects that may not be intuitive to those who are not experienced programmers. Additionally, ECMAScript and other high level scripting languages are generally characterized as dynamic, which means they are weakly typed and use first-class functions.

A weakly typed scripting language, as used herein and in general use, refers to the characteristic of supporting one or more of implicit type conversion (e.g. changing an entity of a first data type into an entity of a second data type) and ad-hoc polymorphism (e.g. allowing values of different data types to be handled using a uniform interface). Weakly typed scripting languages can present difficulties in supporting a script editor that guides the business user creating correct scripts, in particular when the scripts are directed to a database structure that is not explicitly known or that may change. Having first class functions refers to treating functions, as first-class "citizens," which means that the scripting language supports passing functions as arguments to other functions, returning them as the values from other functions, and assigning them to variables or storing them in data structures. This functionality is also commonly referred to as a closure. Support of functions as arguments of other functions can be a complicated feature for relatively inexperienced programmers such as business users.

To address these and potentially other issues with currently available solutions, methods, systems, articles of manufacture, and the like consistent with one or more implementations of the current subject matter can, among other possible advantages, provide a tailored scripting language that is based on a standardized programming language, such as for example ECMAScript, JavaScript, etc., to provide improved ease of use by business users while retaining the benefits of the standardized language. For example, the syntax of the tailored scripting language conforms to that of the standardized language. In addition, the tailored scripting language can be directly executed in any browser without need for any processing and can also run on any server environment using one of the many available ECMAScript runtime processors. As there is no preprocessing, scripts produced in the tailored scripting language can be easily debugged using the native debugger of the execution platform.

Figure 1:
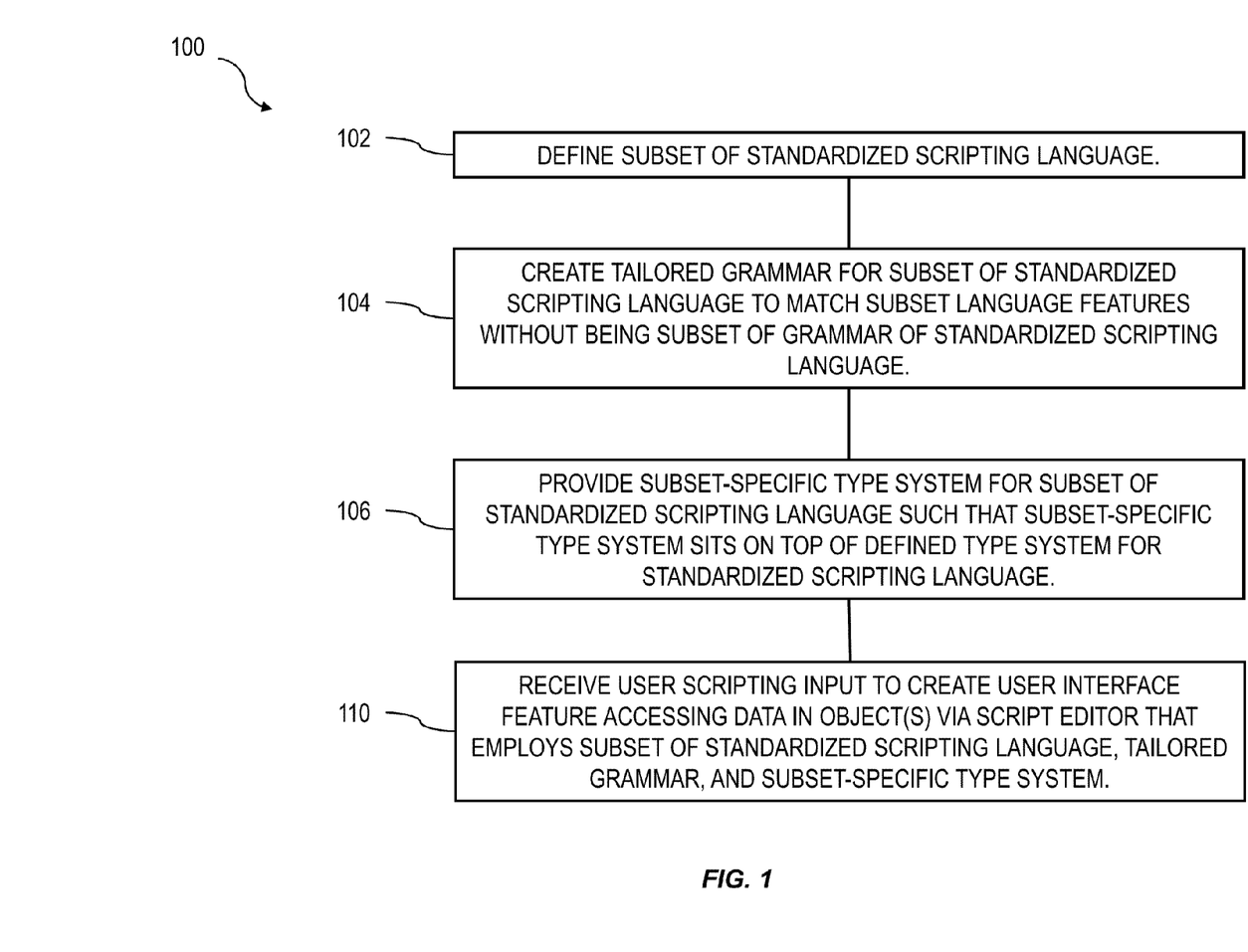
FIG. 1 shows a process flow diagram illustrating aspects of a method having one or more features consistent with implementations of the current subject matter.

One or more of these advantages and possible others can be realized by an approach including one or more features as described herein. FIG. 1 shows a process flow chart 100 illustrating a method consistent with at least one implementation of the current subject matter. At 102, a subset of a standardized scripting language is defined. The subset can advantageously be simplified relative to the unmodified standardized scripting language while retaining a syntax of the standardized scripting language. However the subset is also advantageously selected to include subset language features that are sufficiently powerful to support both an expected skill set of a target user group of an application or group of applications that will use the tailored scripting language and the requirements of an application environment in which the tailored scripting language will be used. The subset of the language is advantageously chosen such that derivation of a current type of an expression is always possible. In at least some implementations of the current subject matter, features relating to first class functions or closures can be advantageously omitted from the subset of the language.

At 104, a tailored grammar is created for the subset of the standardized scripting language. This tailored grammar is created to match the subset language features and is not a subset of the grammar of the standardized scripting language. However, each of the subset language features is defined within the subset grammar to be compatible with a specification of the standardized scripting language (e.g. with the specification for the ECMAScript language).

At 106, a subset-specific type system is provided for the subset of the standardized scripting language such that the subset-specific type system sits on top of a defined type system for the standardized scripting language. The subset-specific type system can advantageously include a type inference capability that accesses information about the underlying data structures and provides guidance to a user during scripting such that any conflicts between the script and the data structure are identified during scripting. Such conflicts can optionally be identified visually to a user as discussed in greater detail below.

At 110, a script editor receives user scripting to create a user interface feature that access data in one or more objects. The user interface feature can include one or more of a chart, a table, or the like, and can optionally be part of a dashboard user interface. The user scripting is performed using the subset of the standardized scripting language, the tailored grammar, and the subset-specific type system.

The tailored grammar can support the implementation of a custom, full-featured script editor for scripting of dashboard and other tools for access of data retained in a customizable database. In some implementations of the current subject matter, the subset of the standardized scripting language and the grammar can be defined using a framework such as XText (available from The Eclipse Foundation of Ottawa, Ontario, Canada).

In a further, optional variation of the method described in reference to FIG. 1, a second language, which can optionally be a domain-specific (DSL) that is specific to the application, domain, etc. in which the tailored scripting language is to be used, can allow the available types (simple types and classes) with their field and methods to be specified. This feature can provide an easily extensible library of objects and functions to be provided to the business user. Other approaches to providing an external resource (e.g. not within ECMAScript or other standardized scripting languages which lack support for concept classes) for handling of typing information are also within the scope of the current subject matter.

A type system and library of objects and functions consistent with implementations of the current subject matter can form an efficient tool for validation of user entered scripts to comply to the subset of ECMAScript. A validation consistent with implementations of the current subject matter is generally more strict than that of the standardized ECMAScript specification. If all scripts are validated before execution it can be guaranteed that the scripts can not harm the execution environment.

Figure 2:
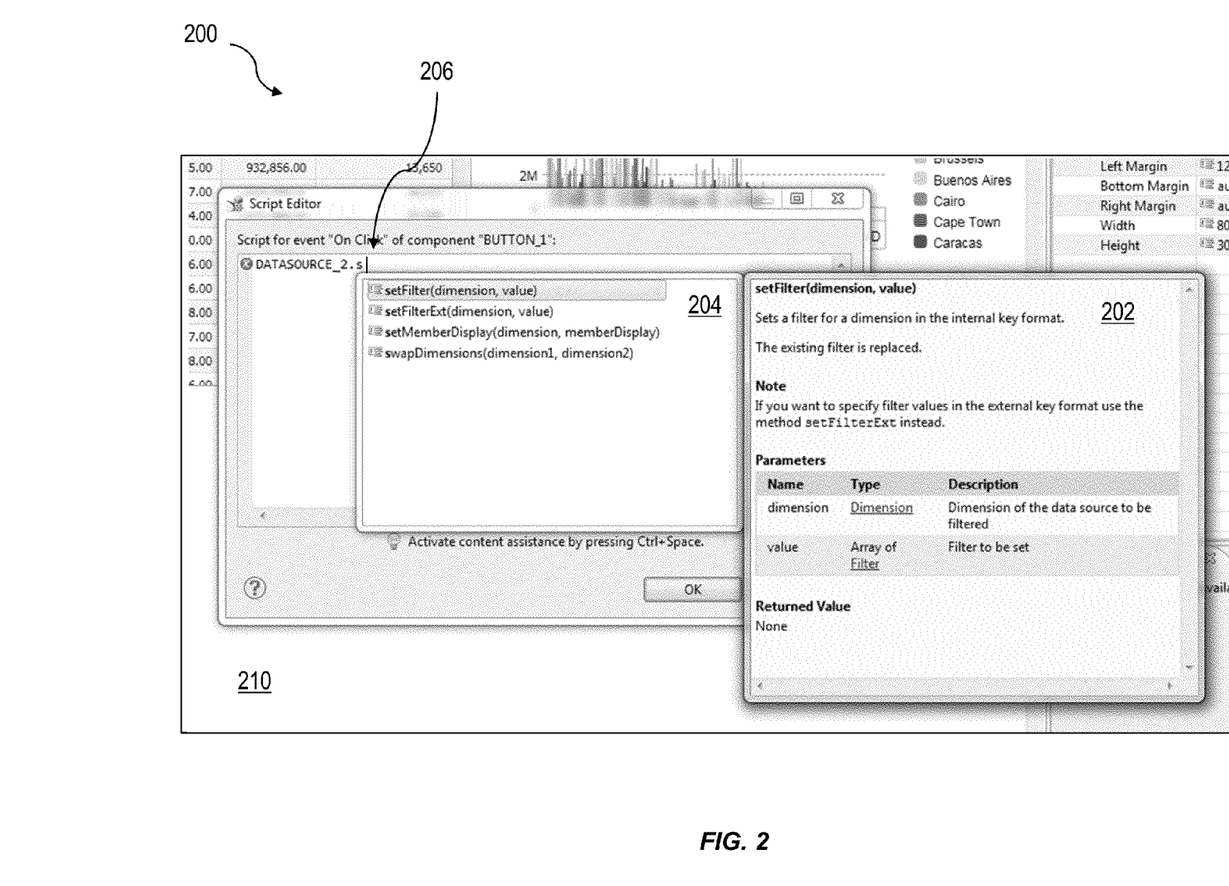
FIG. 2 through FIG. 12 show a series of screenshots illustrating features consistent with one or more implementations of the current subject matter.

FIG. 2 shows a screenshot view 200 illustrating features relating to display of a user interface element, such as for example a hover box 202, providing a display of detailed documentation about available methods that can be applied on a data source. In this example, the script editor derives a type of the entered string DATASOURCE_2 and searches a type library (e.g. a second DSL) for methods starting with the letter "s" which in this example is the currently in-progress user input string. A first user interface element, such as for example a window 204, can be displayed to indicate those methods matching the currently in-progress user input string, which were derived by the script editor as being available for use with the data source DATASOURCE_2. A second user interface element, such as for example a hover box 204, can provide information about a method selected in the window 204.

In operation, the functionality illustrated in FIG. 2 can perform as follows: a user type or otherwise enters a variable name (in this example "DATASOURCE_2") followed by a period (a dot, etc.) and the script editor then accesses a list of functions available for application on the object specified by the variable name. To accomplish this, it is necessary to know the type of the object specified by the variable name. In this example, the variable DATASOURCE_2 has a type that is determined by the script editor as the user enters the character string. In this manner, when a designer or other user using the script editor places an object on a palette 210 (e.g. a design space for a dashboard or other user interface view to be supported by data accessed using the scripting language), that object has a known type when it is added to the palette. In contrast, in many standardized scripting languages, such as for example ECMAScript, objects are only typed at runtime. Such languages generally lack classes that can specify types at design time and can therefore only accept variables at design time without being able to verify that an entered dimension, variable, is consistent with the type of object already specified in a script. Consistent with implementations of the current subject matter, an external typing tool, which can optionally be a second language, which can be a DSL, can include type descriptions, and can therefore provide information for each component what type it has. The components matching the type of a data source or other already selected object in the script are the methods, functions, etc. which are made available to the user as he or she continues generation of the script.

Figure 3:
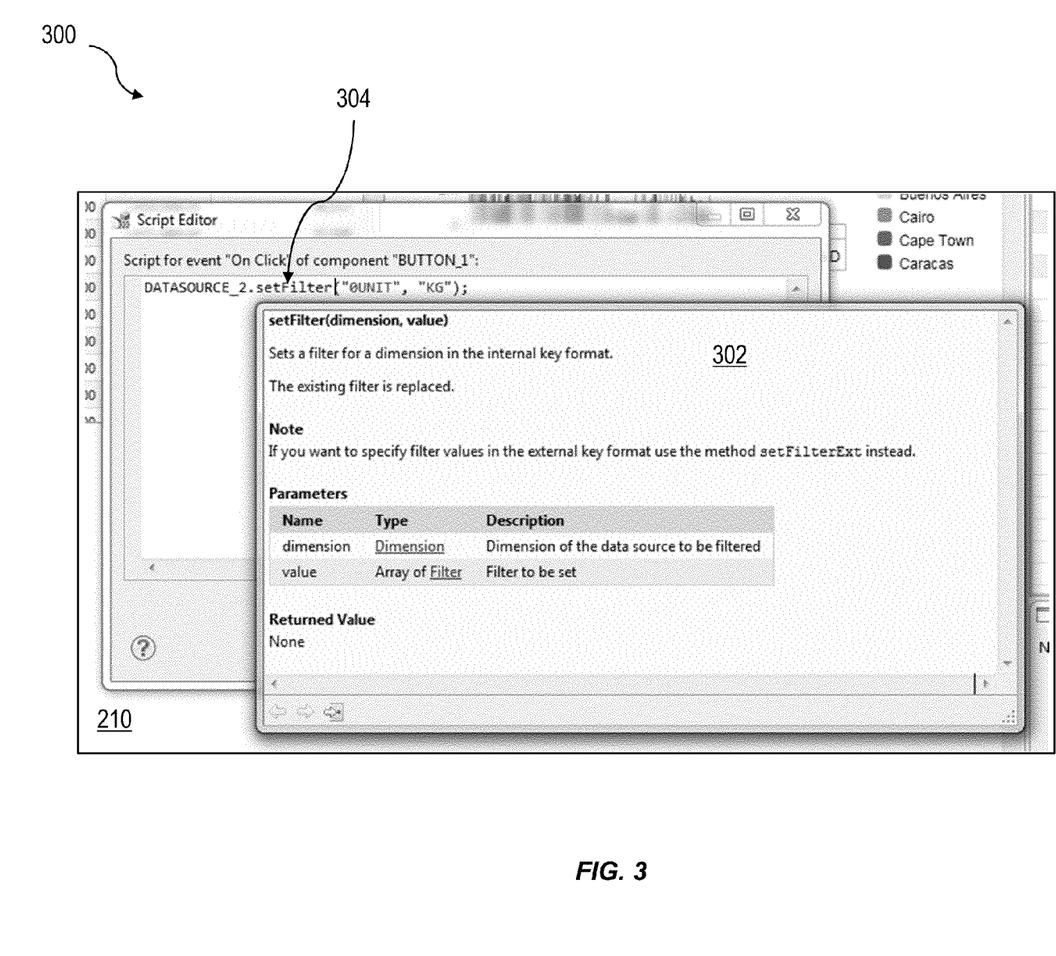

FIG. 3 shows a screenshot view 300 illustrating features relating to display of a user interface element, such as for example a hover box 302, to present to a user results of a search of a type library (e.g. one provided in a second DSL) for a method, function, etc. matching an input string 304 (in this example "setFilter"). The editor drives the type of the object DATASOURCE_2 after that variable is entered and then queries the type library. The hover box or other user interface element can provide documentation about the purpose of the selected method, function, etc. and the parameters required for its execution.

Figure 4:
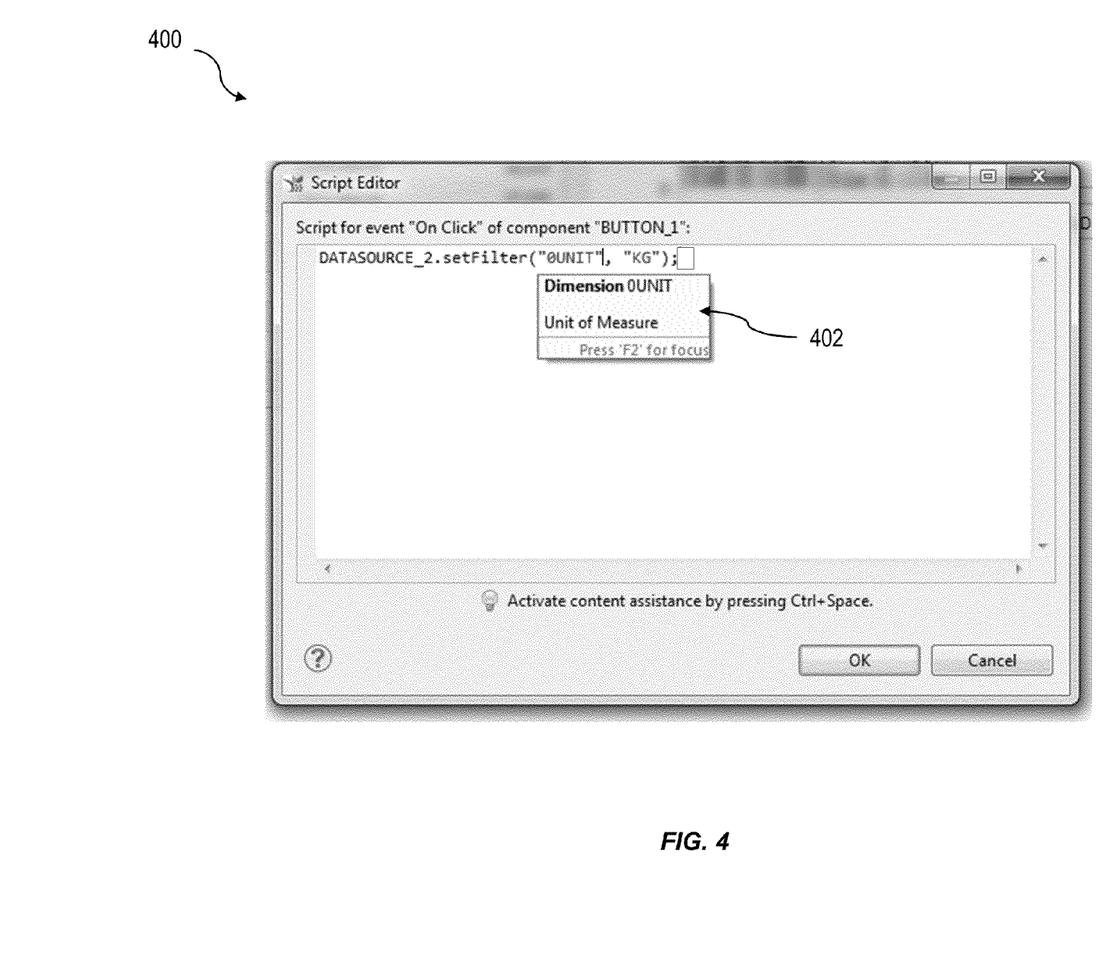

FIG. 4 shows a screenshot view 400 illustrating features relating to display of a user interface element, such as for example a hover box 402, displaying information acquired from one or more data sources, for providing assistance to a user in resolving an entered string to a correct type and description compatible with the underlying data source. The example shows, how a type system consistent with implementations of the current subject matter can translate a simple string "0UNIT" to a more complex structure (Dimension named "Unit of Measure"), because it knows the context. Using a standardized scripting language lacking one or more features described herein, an entered string would not be resolved to a known type until runtime. Because of the availability of a type library in implementations of the current subject matter, the editor can derive that the string "0Unit" is a dimension and that the object DATASOURCE_2 has a specific cube assigned to it.

Figure 5:
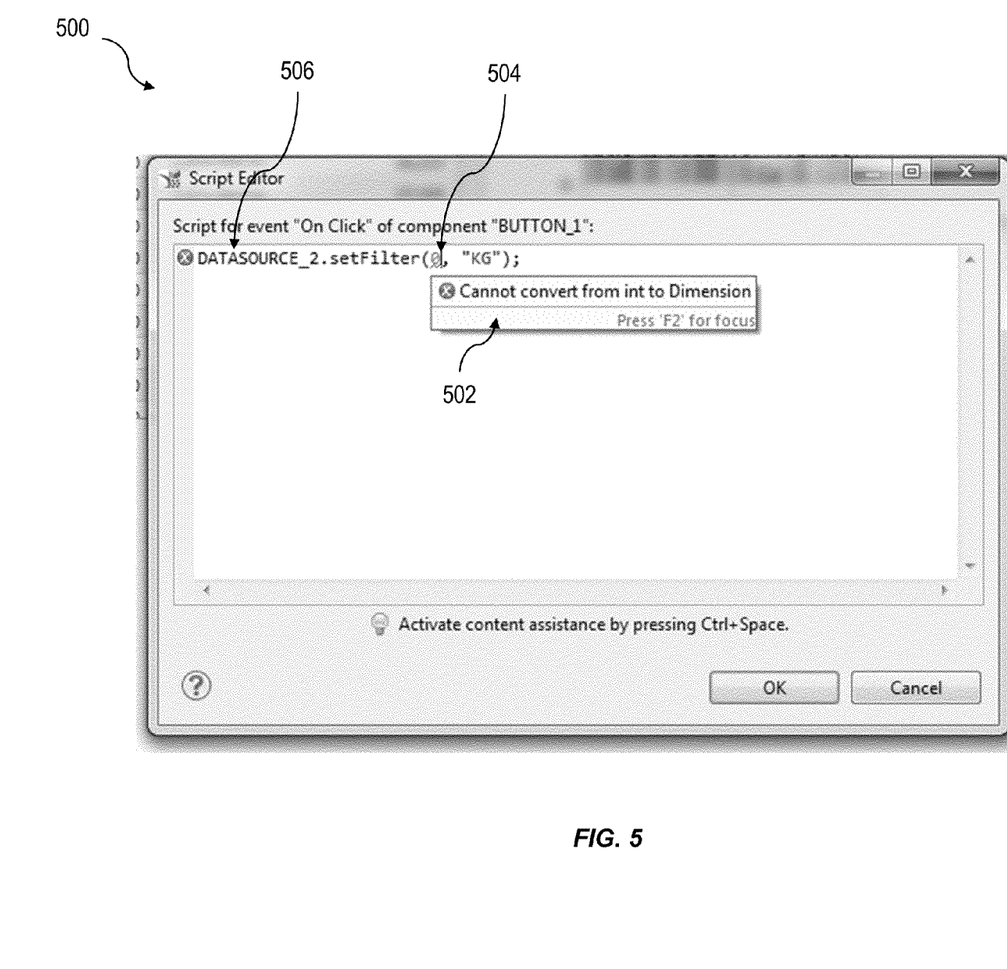

FIG. 5 shows a screenshot view 500 illustrating features relating to display of a user interface element, such as for example a hover box 502 indicating a validation error associated with a bad argument type between an entered argument 504 and the selected data source 506. In a simplified example, an integer value is entered, but the editor can determine that at least a string is needed to comply with the type system. Thus, there exists a mismatch between the entry and the type of the dimension.

Figure 6:
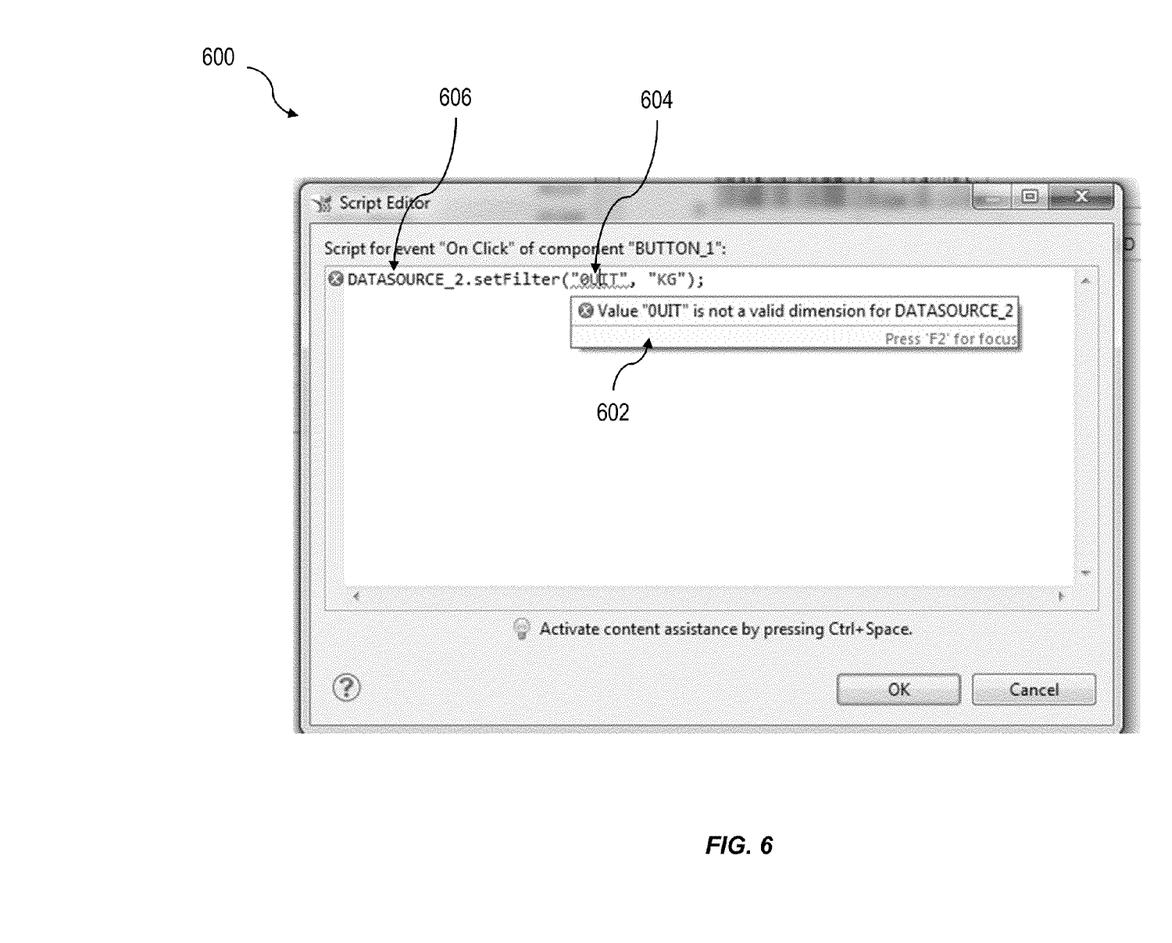

FIG. 6 shows a screenshot view 600 illustrating features relating to display of a user interface element, such as for example a hover box 602 indicating a validation error associated with a bad argument value between an entered dimension 604 and the selected data source 1006. Here a string is passed, which is inappropriate match type of the dimension. However the name specified by the string is not a valid dimension for the object. To enable this functionality, an editor and tailored scripting language consistent with temptations of the current subject matter has a context sensitive type system.

Figure 7:
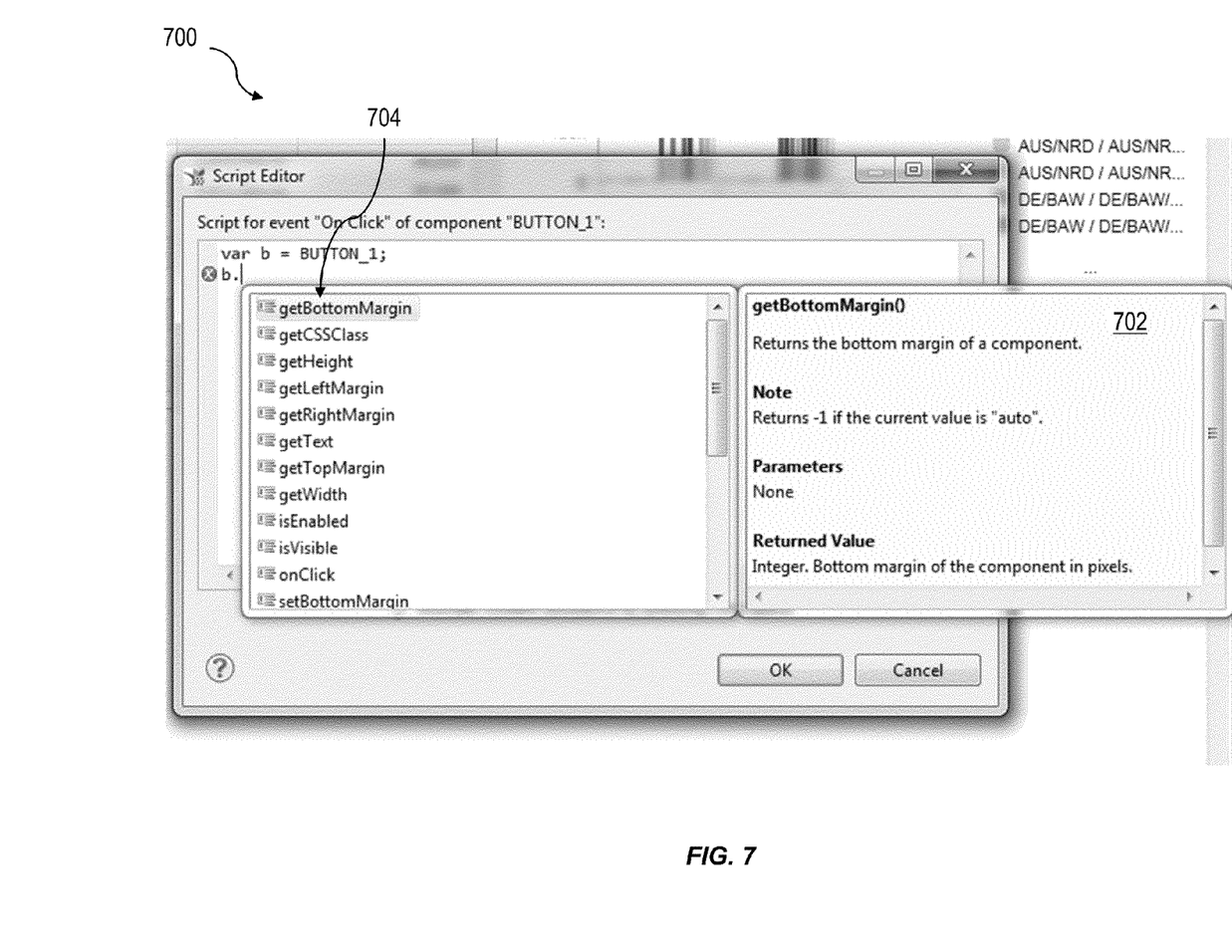

FIG. 7 shows a screenshot view 700 illustrating features relating to display of a user interface element, such as for example a hover box 702, that provides feedback to a user regarding initialization of local variables (which can displayed in a list 704) with type information. Similar to the situation presented in FIG. 6, the type information of "b" is derived based on the variable initialization before. In a language subset consistent with implementations of the current subject matter, a variable declaration such as the statement "var b;" which would be allowed in a standardized scripting language such as ECMAScript is excluded. Instead, a variable declaration consistent with implementations of the current subject matter can link a declared variable to another object, for example "var b=BUTTON_1;" which allows an inference that "b" has the same type as "BUTTON_1".

Figure 8:
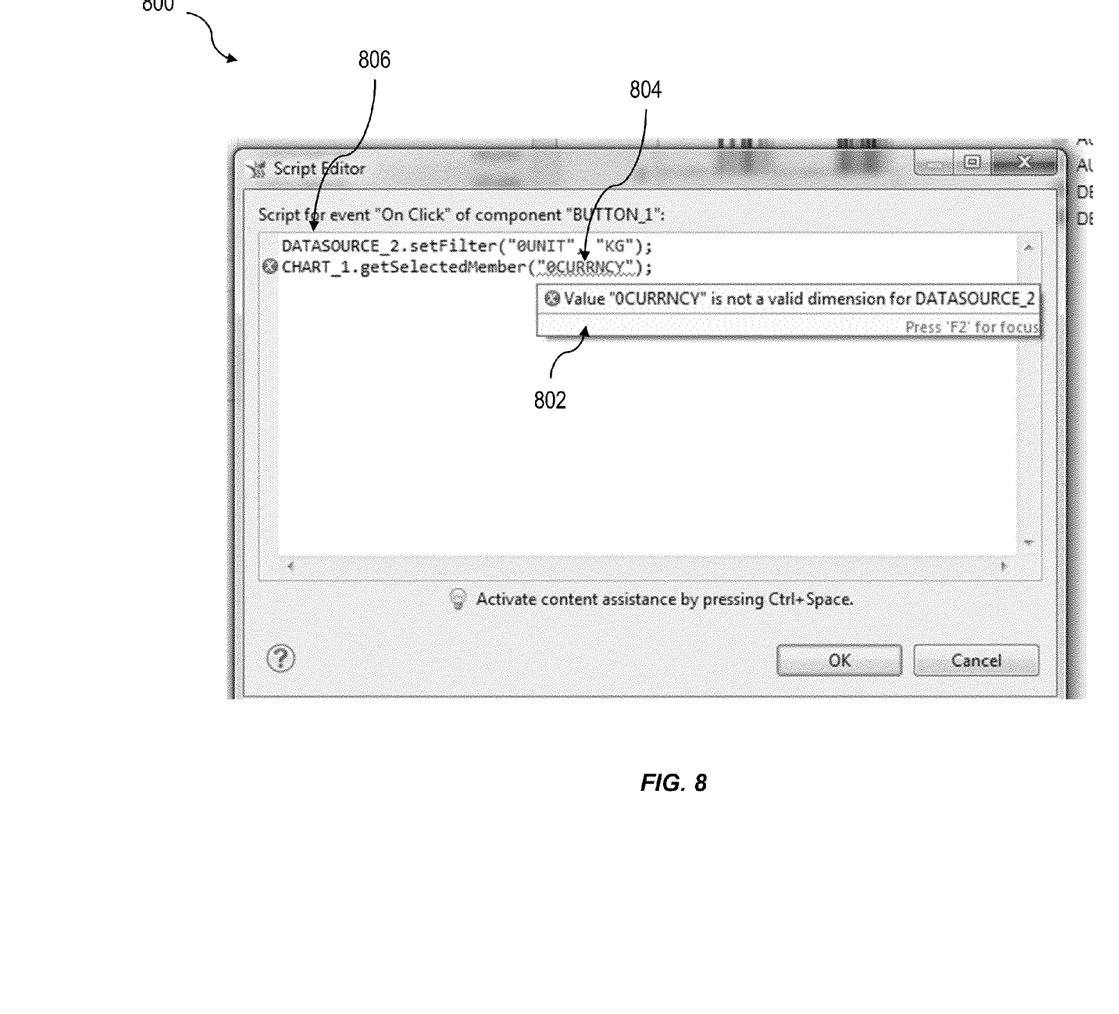

FIG. 8 shows a screenshot view 800 illustrating features relating to display of a user interface element, such as for example a hover box 802, that provides feedback to a user indicating a type mismatch with a selected dimension 804 of a selected data source 806. This example illustrates some features of an instance-specific type inference system consistent with implementations of the current subject matter.

Using type inference checking as discussed elsewhere herein, it can be determined that the first parameter of the method "getSelectedMember" is a dimension. It can be known that dimensions are always instance specific. CHART_1 is bound to DATASOURCE_2 (this binding need not be part of the language, but can be set by a user using a tool in a property sheet or the like. In this manner, it can be inferred (and therefore required to avoid an error message) that the entered value must fit to the valid dimensions of DATASOURCE_2.

Figure 9:
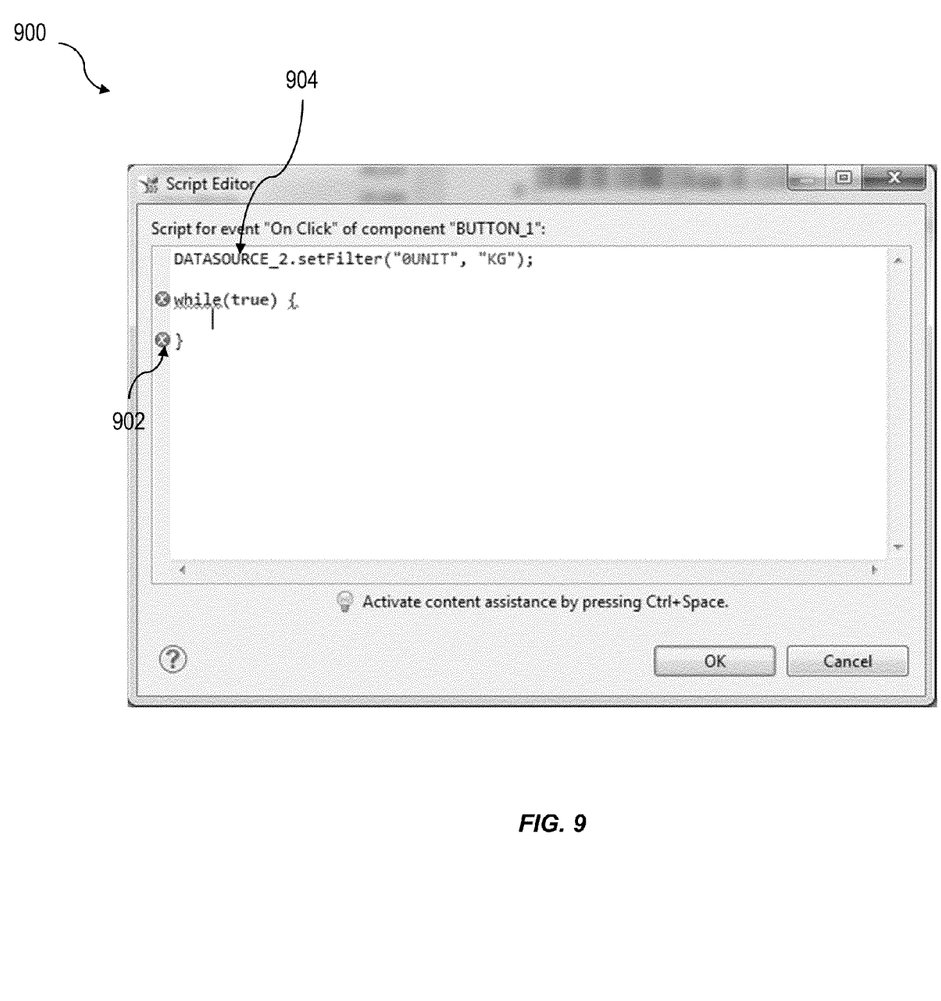

FIG. 9 shows a screenshot view 900 illustrating features relating to display of a user interface element, such as for example an error indicator 902 indicating a validation error associated with an unsupported language construct 904. This example illustrates how the language subset can, in some implementations of the current subject matter, be tailored to exclude code constructs that can be dangerous at runtime from being usable by a designer who might not be sufficiently familiar with coding to know to avoid such errors. In the displayed example, the code "while(true) [ ]" would result in an endless loop.

Figure 10:
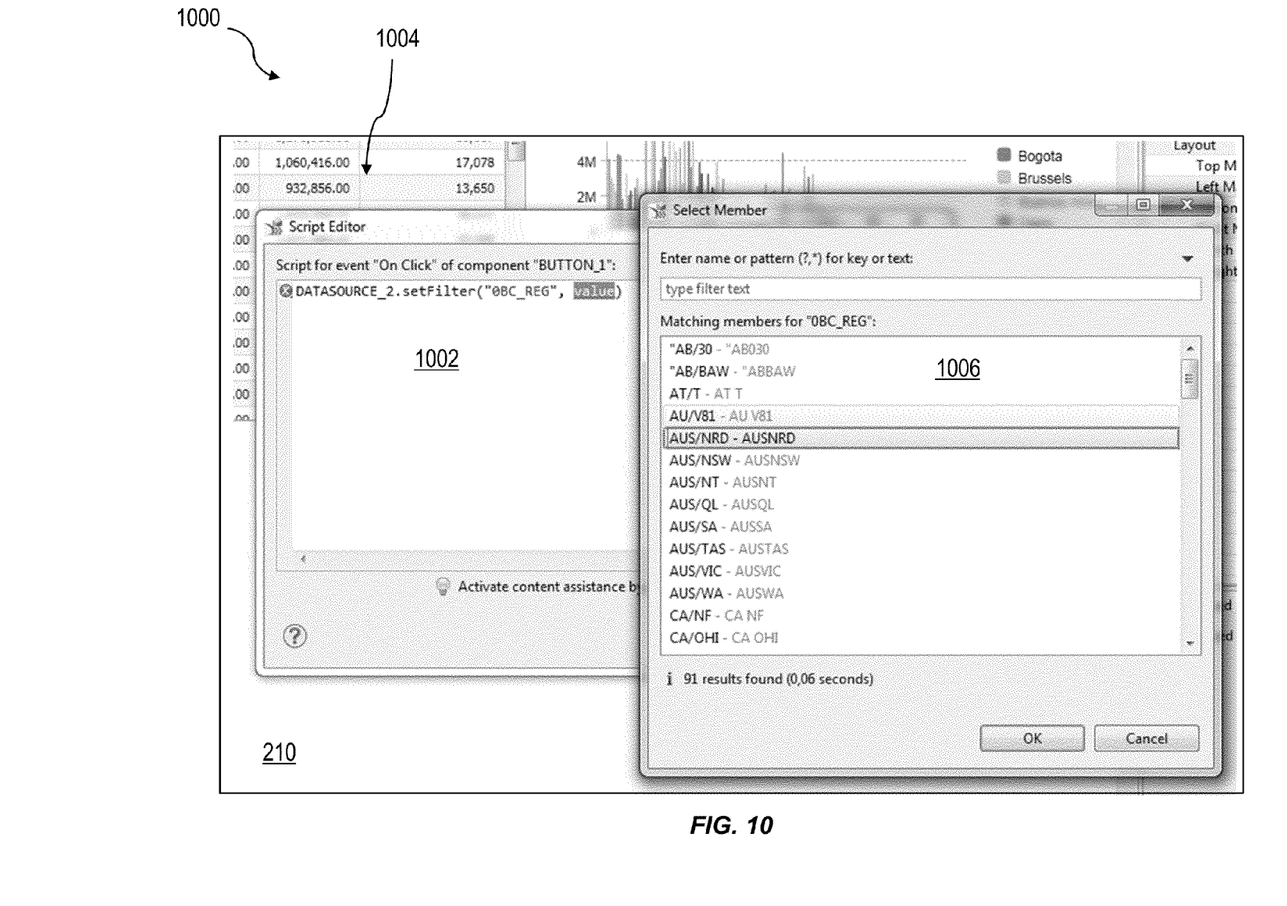

FIG. 10 shows a screenshot view 1000 illustrating features relating to provision of one or more user interface elements, such as for example a script editor window 1002 displayed in response to a user input to create a script relating to a data presentation element 1004 (e.g. a table, a chart, etc.) and a further window 1006 displayed to allow selection of an appropriate type for data entry for a selected variable. The displayed functionality is an example of a double context-specific help that can be provided via a model dialog. This example illustrates that that a type system consistent with implementations of the current subject matter can validate consistency between parameters, even for a specific instance. In other words, both the instance state of DATASOURCE_2 and the parameter value of first parameter ("OBC_REG") determine what is valid for the second parameter.

Figure 11:
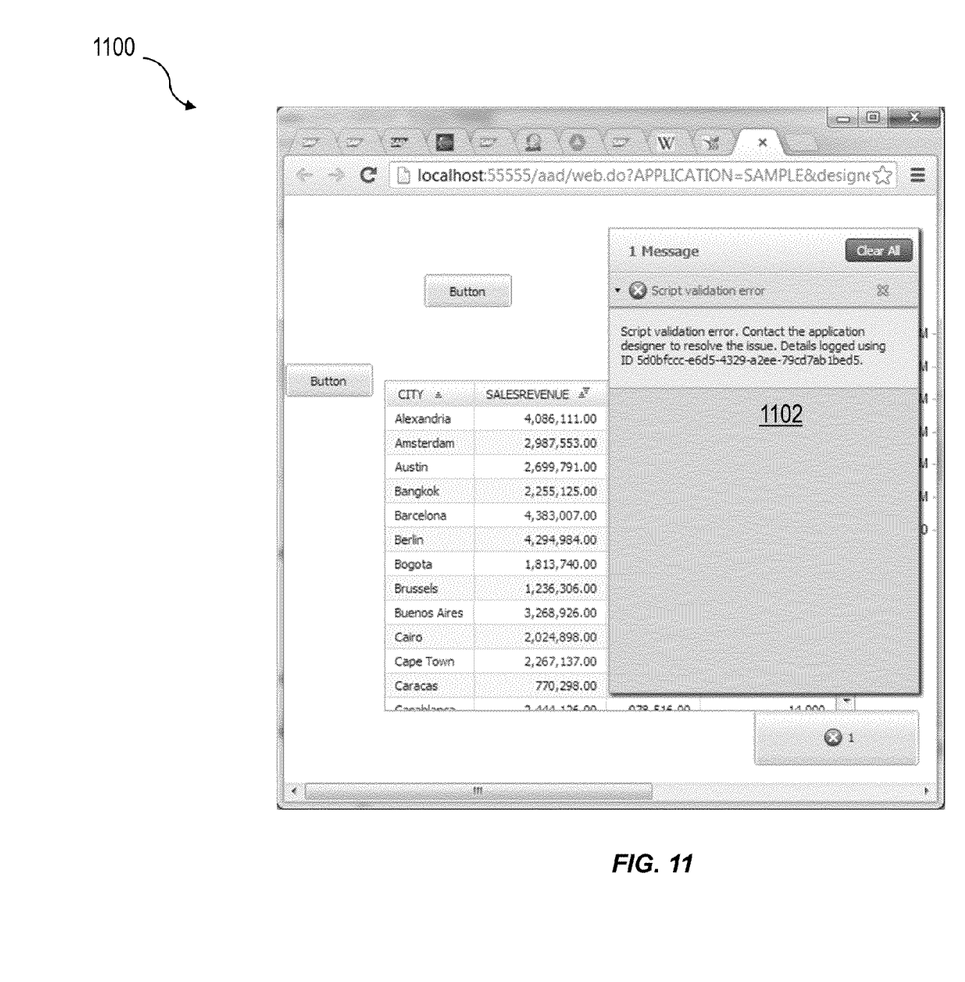

FIG. 11 shows a screenshot view 1200 illustrating features relating to display of a user interface element, such as for example a hover box or error message box 1202 indicating during design time a validation error that would arise during execution at runtime. Before the script is executed, the same validation checks as at design time can be applied. The script would be executed if no issues were found and such that no harm occurs to the application.

Figure 12:
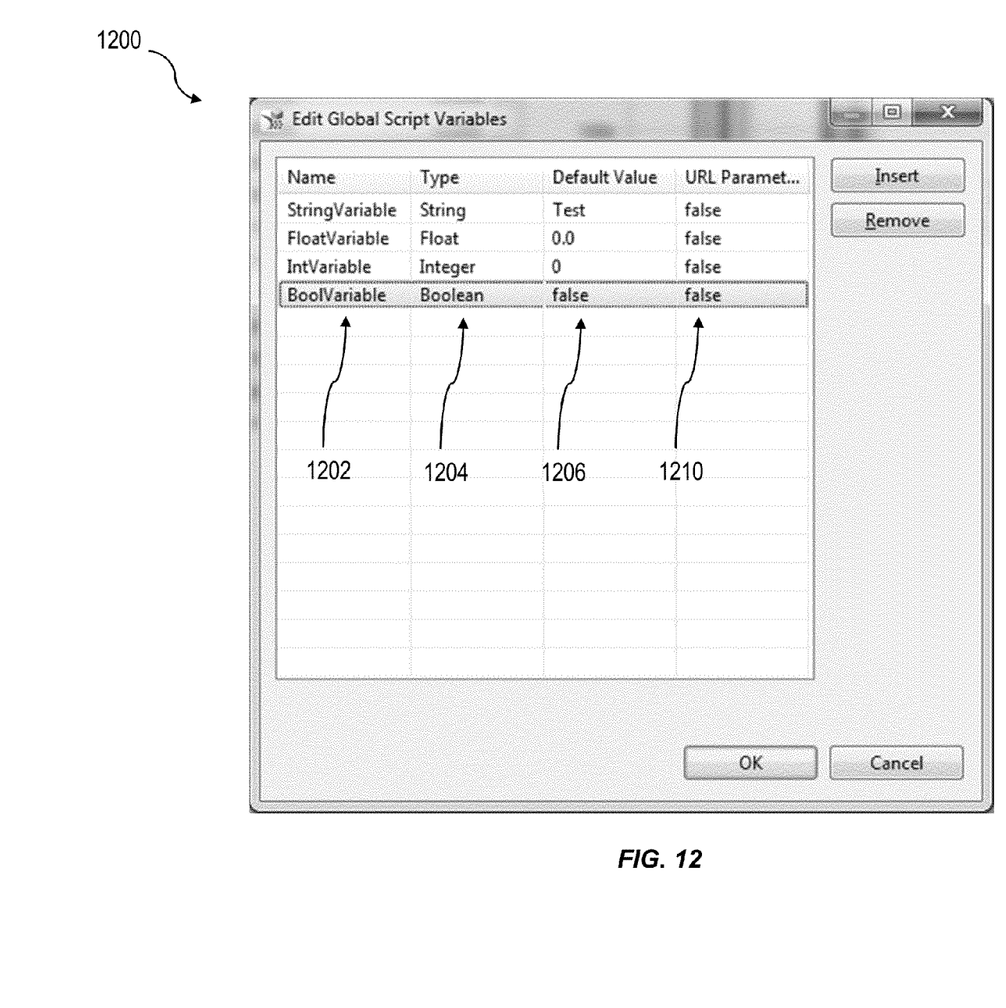

FIG. 12 shows a screenshot view 300 illustrating features relating to display of a user interface element, such as for example a window displaying an editable table, for editing global script variables. In this example, a global variable 302 can be declared with a type 304, an initial or default value 306, and a logical expression determining whether a uniform resource locator (URL) parameter is associated with the global variable. Declaration of external variables can be externalized consistent with one or more implementations of the current subject matter. In ECMAScript, a global variable might be declared using a statement such as "var myVariable." However, in certain implementations of the current subject matter, such a construct can be removed from the language subset as there may in many use cases be insufficient information about the variable. For example, such a construct does not include typing for the variable. The global variable definition features shown in FIG. 12 can resolve this issue by ensuring that type and other global variable parameters are available for each global variable.

Figure 13:
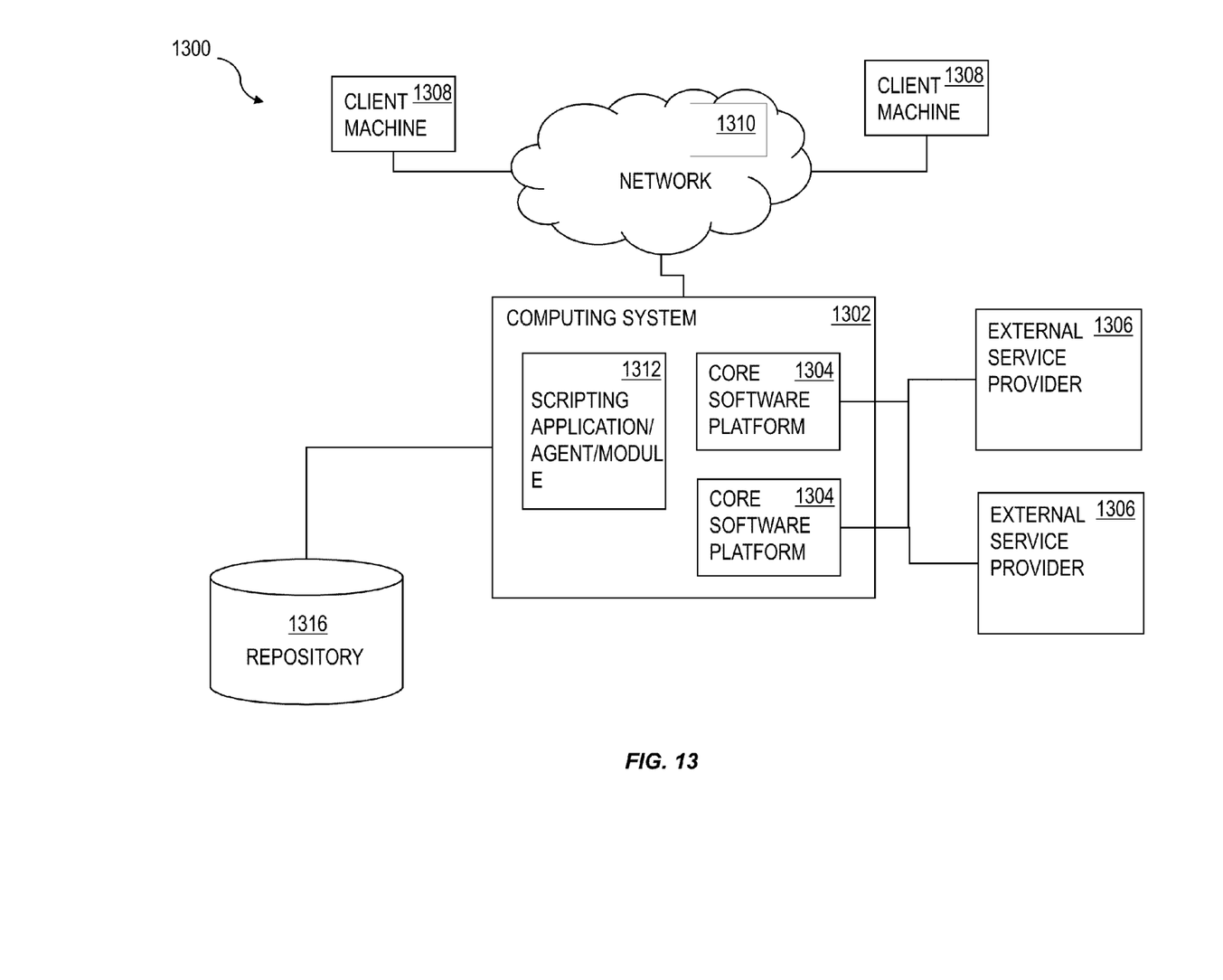
FIG. 13 shows a diagram illustrating aspects of a system showing features consistent with implementations of the current subject matter.

FIG. 13 shows a diagram of a system consistent with one or more implementations of the current subject matter. A computing system 1302 can include one or more core software platform modules 1304 providing one or more features of a business software system. The computing system 1302 can optionally be a self-contained computing system or a distributed computing system, for example one in which computing loads are spread across more than one physical processor, virtual machine, etc. The computing system 1302 can also optionally include one or more core software modules 1304 that support various aspects of a business software suite or application and can aggregate or otherwise provide a gateway via which users can access functionality provided by one or more external service providers 1306. Client machines 1308 can optionally access the computing system, either via a direct connection, a local terminal, or over a network 1310 (e.g. a local area network, a wide area network, a wireless network, the Internet, or the like). A scripting application or agent or module 1312 featuring the ability to prepare scripts using a scripting approach and/or language consistent with one or more features herein can be hosted on the computing system 1302 or alternatively, on an external system accessible over a network connection or even on one or more of the client machines 1308.

The scripting application or agent or module 1312 can access one or more repositories 1316 (e.g. process repositories, scenario repositories, transactional data repositories, metadata repositories, etc.) that can optionally store one or more of definitions of business scenarios, business processes, and one or more business configurations as well as data, metadata, master data, etc. relating to definitions of the business scenarios, business processes, and one or more business configurations, and/or concrete instances of the data objects (e.g. business objects) that are relevant to a specific instance of the business scenario or a business process. In some examples, the definition can optionally be stored as a business object. In some implementations, the business object can include a template definition of a standard business process.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:

receiving a user scripting input via a script editor displayed to a user on a displayed of a computing device, the user scripting input comprising a script using a subset language of a standardized scripting language, the subset language being simplified relative to the standardized scripting language while retaining a syntax of the standardized scripting language and comprising a tailored grammar matching features of the subset language without being a subset of a grammar of the standardized scripting language, each of the subset language features being defined within the tailored grammar of the subset to be compatible with a specification of the standardized scripting language, the user scripting input creating a user interface feature accessing data in one or more objects;

determining a type for a variable entered as part of the scripting input during input of a character string of the scripting input, the determining comprising use of a subset-specific type system for the subset of the standardized scripting language, the subset-specific type system providing a type inference capability that accesses information about an underlying data structure of the one or more objects, the subset-specific type system adding to a defined type system for the standardized scripting language; and querying a type library to display to the user assistance information for resolving the character string to a correct type and description compatible with the underlying data structure.

2. A computer program product as in claim 1, wherein the standardized scripting language comprises at least one of ECMAScript and JavaScript.

3. A computer program product as in claim 1, wherein the subset-specific typing system comprises a second domain-specific language that handles typing for one or more components related to the one or more objects.

4. A computer program product as in claim 1, wherein the user interface feature comprises one or more of a chart and a table.

5. A computer program product as in claim 1, wherein the tailored grammar comprises requiring that a variable declaration link a declared variable to another object.

6. A system comprising:

at least one programmable processor; and a machine-readable medium storing instructions that, when executed by the at least one programmable processor, cause the at least one programmable processor to perform operations comprising:

receiving a user scripting input via a script editor displayed to a user on a displayed of a computing device, the user scripting input comprising a script using defining a subset language of a standardized scripting language, the subset language being simplified relative to the standardized scripting language while retaining a syntax of the standardized scripting language and comprising a tailored grammar matching features of the subset language without being a subset of a grammar of the standardized scripting language, each of the subset language features being defined within the tailored grammar of the subset to be compatible with a specification of the standardized scripting language, the user scripting input creating a user interface feature accessing data in one or more objects;

determining a type for a variable entered as part of the scripting input during input of a character string of the scripting input, the determining comprising use of a subset-specific type system for the subset of the standardized scripting language, the subset-specific type system providing a type inference capability that accesses information about an underlying data structure of the one or more objects, the subset-specific type system adding to a defined type system for the standardized scripting language; and querying a type library to display to the user assistance information for resolving the character string to a correct type and description compatible with the underlying data structure.

7. A system as in claim 6, wherein the standardized scripting language comprises at least one of ECMAScript and JavaScript.

8. A system as in claim 6, wherein the subset-specific typing system comprises a second domain-specific language that handles typing for one or more components related to the one or more objects.

9. A system as in claim 6, wherein the user interface feature comprises one or more of a chart and a table.

10. A system as in claim 6, wherein the tailored grammar comprises requiring that a variable declaration link a declared variable to another object.

11. A computer-implemented method comprising:

receiving a user scripting input via a script editor displayed to a user on a displayed of a computing device, the user scripting input comprising a script using a subset language of a standardized scripting language, the subset language being simplified relative to the standardized scripting language while retaining a syntax of the standardized scripting language and comprising a tailored grammar matching features of the subset language without being a subset of a grammar of the standardized scripting language, each of the subset language features being defined within the tailored grammar of the subset to be compatible with a specification of the standardized scripting language, the user scripting input creating a user interface feature accessing data in one or more objects;

determining a type for a variable entered as part of the scripting input during input of a character string of the scripting input, the determining comprising use of a subset-specific type system for the subset of the standardized scripting language, the subset-specific type system providing a type inference capability that accesses information about an underlying data structure of the one or more objects, the subset-specific type system adding to a defined type system for the standardized scripting language; and querying a type library to display to the user assistance information for resolving the character string to a correct type and description compatible with the underlying data structure.

12. A computer-implemented method as in claim 11, wherein the standardized scripting language comprises at least one of ECMAScript and JavaScript.

13. A computer-implemented method as in claim 11, wherein the subset-specific typing system comprises a second domain-specific language that handles typing for one or more components related to the one or more objects.

14. A computer-implemented method as in claim 11, wherein the user interface feature comprises one or more of a chart and a table.

15. A computer-implemented method as in claim 11, wherein the tailored grammar comprises requiring that a variable declaration link a declared variable to another object.

16. A computer-implemented method as in claim 11, wherein at least one of the defining, the creating, the providing, and the receiving is performed by at least one system comprising at least one programmable processor.

* * * * *